United States Patent

Satran et al.

[11] Patent Number: 5,226,761
[45] Date of Patent: Jul. 13, 1993

[54] METAL CUTTING INSERT AND METAL CUTTING TOOL UTILIZING THE METAL CUTTING INSERT

[75] Inventors: Amir Satran; Gideon Boianjiu, both of Kfar Havradim, Israel

[73] Assignee: Iscar Ltd., Tefen, Israel

[21] Appl. No.: 767,117

[22] Filed: Sep. 27, 1991

[51] Int. Cl.$^5$ .............................. B23B 27/16
[52] U.S. Cl. .................... 407/114; 407/116
[58] Field of Search ............. 407/113, 114, 115, 116

[56] References Cited

U.S. PATENT DOCUMENTS

| | | | |
|---|---|---|---|
| 3,973,307 | 8/1976 | McCreery | 407/114 |
| 4,056,871 | 11/1977 | Bator | 407/114 |
| 5,044,839 | 9/1991 | Takahashi | 407/114 |

Primary Examiner—Steven C. Bishop
Attorney, Agent, or Firm—Burgess, Ryan and Wayne

[57] ABSTRACT

A metal cutting insert for use in turning or drilling operations and having a rake surface and a pair of relief flanks merging in a nose of radius r and defining with the rake surface a pair of cutting edges; each cutting edge having a first portion of length l tangential with the corner, the first portion enclosing an angle $\epsilon$ and a second subsequent portion defining between them an angle $\beta$; a chip former groove being formed in the rake surface adjacent the cutting edges and the nose. The cutting edge is positive in the region of the nose and the first portions and the chip former groove adjacent thereto have a first portion which slopes towards a base of the insert, any chip deflecting portion thereof being sufficiently spaced from the cutting edge to allow for chips to have reached a desired minimal length prior to their deflection.

4 Claims, 6 Drawing Sheets detail-B ively low, there is also a corresponding increase in vibrational frequency $F_r$.

METAL CUTTING INSERT AND METAL CUTTING TOOL UTILIZING THE METAL CUTTING INSERT

FIELD OF THE INVENTION

This invention relates to a metal cutting insert for use in turning or drilling operations and is particularly concerned with such inserts for use in finishing operations.

BACKGROUND OF THE INVENTION

It is well known with turning and drilling tools employing metal cutting inserts that the quality and precision of finish is a function of the tool geometry and machining conditions and, thereby the tool output. Thus, it is known that the higher the tool output, the lower the quality and precision of the finish. Thus, the cut surface tends to image to a greater or lesser degree the shape of the cutting edge of the tool insert or tip, this surface bearing a series of consecutive grooves. It is known to represent the quality of surface finish in terms of the mean depth h of these surface grooves and, as a first approximation, this mean surface depth $R_t$ can be given by the relationship $$R_t = \frac{f^2}{8 \times r}$$

where f is the feed of the cutting tool and r is the nose radius of the insert. As used in the present application, the term "feed" denotes the traverse of the cutting tool with respect to the work piece in the direction of the axis of rotation of the work piece per unit rotation of the work piece.

From this relationship, it can be readily seen that h increases (and therefore the surface finish improves) with decreasing feed values and/or increasing nose radii.

It is, however, also well known that another factor which influences surface finish is the vibration induced in the tool by the cutting process. Thus, the surface finish is deleteriously affected by any increase in the vibration frequency and/or the amplitude of the vibrations. In this connection, it can be shown that the frequency and amplitude of the vibrations is directly related to the nature of the chip flow, in particular to the frequency of breakage of the chips produced in the cutting operation. Because an increased frequency of chip breakage necessarily involves the production of shorter chips, the vibration frequency increases with the reduction in the length of the chips.

At the same time, it can be shown that the amplitude of the vibrations is mainly related to the cutting forces which are generated during the cutting operations, these cutting forces tending to increase with increasing depth of cut $a_p$. On the other hand, it is known that with relatively low depths of cut such as those which occur during finishing operations, and especially with insert noses having a relatively large radii r, that the frequency of vibrations induced in the tool ($F_r$) tends to increase. Similarly, it is known that with tools where the angle of inclination of the cutting edge ($\theta$) is relatively low, there is also a corresponding increase in vibrational frequency $F_r$.

It will therefore be seen that the factors affecting the surface finish of the workpiece are numerous and the variation of one factor so as to improve the surface finish often carries with it a variation of another factor which tends to affect unfavorably the quality of surface finish.

BRIEF SUMMARY OF THE INVENTION

It is therefore an object of the present invention to provide a new and improved cutting insert and a metal cutting tool incorporating such a cutting insert, in which the above-referred-to disadvantages are substantially reduced.

According to the present invention, there is provided a metal cutting insert for use in turning or drilling operations and having a rake surface and a pair of relief flanks merging in a nose of radius r and defining with said rake surface a pair of cutting edges; at least one of said cutting edges having a first portion of length l tangential with said nose and a subsequent second portion the first portion of one cutting edge enclosing an angle $\epsilon$ with a first corresponding portion of the other cutting edge, the second portion of said one cutting edge enclosing an angle $\beta$ with a second corresponding portion of the other cutting edge; a chip former groove being formed in said rake surface adjacent said cutting edges and said nose; a rake angle of said one cutting edge being substantially positive in the region of said nose and said first portion and the chip former groove adjacent thereto having a first portion which slopes towards a base of said insert, any chip deflecting portion thereof being sufficiently spaced from the cutting edge to allow for chips to have reached a desired minimal length prior to their deflection and wherein $l \geq$ maximum feed $f_{max}$, and $\epsilon$ is greater than $\beta$.

Preferably the first corresponding portion is also of length l tangential with said nose.

With such a metal cutting insert and a metal cutting tool incorporating such an insert, while one of the cutting edges of the pair of cutting edges effects the actual cutting operation, the first cutting edge portions of the other cutting edge of the pair which is provided with a minimal relief angle with respect to the cut surface of the workpiece, effectively smoothes that cut surface so as to provide a good surface finish. At the same time, by virtue of the provision of the particular chip former construction in the regions of the nose and the first cutting portions, it is ensured that the chips formed thereby flow with minimal resistance, thereby ensuring a reduction in the cutting forces and also ensuring that the chips produced are relatively long and, in consequence the frequency of chip breaking is reduced. Thus, this tends to result in a reduction of the vibrational frequency and also in the amplitudes thereof.

By virtue of this reduction of vibrational frequency and the amplitudes thereof, it is possible to allow for an increased feed without unduly affecting the quality of surface finish. With such an increased feed, the output can be significantly increased, and not necessarily at the expense of the surface finish.

BRIEF DESCRIPTION OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
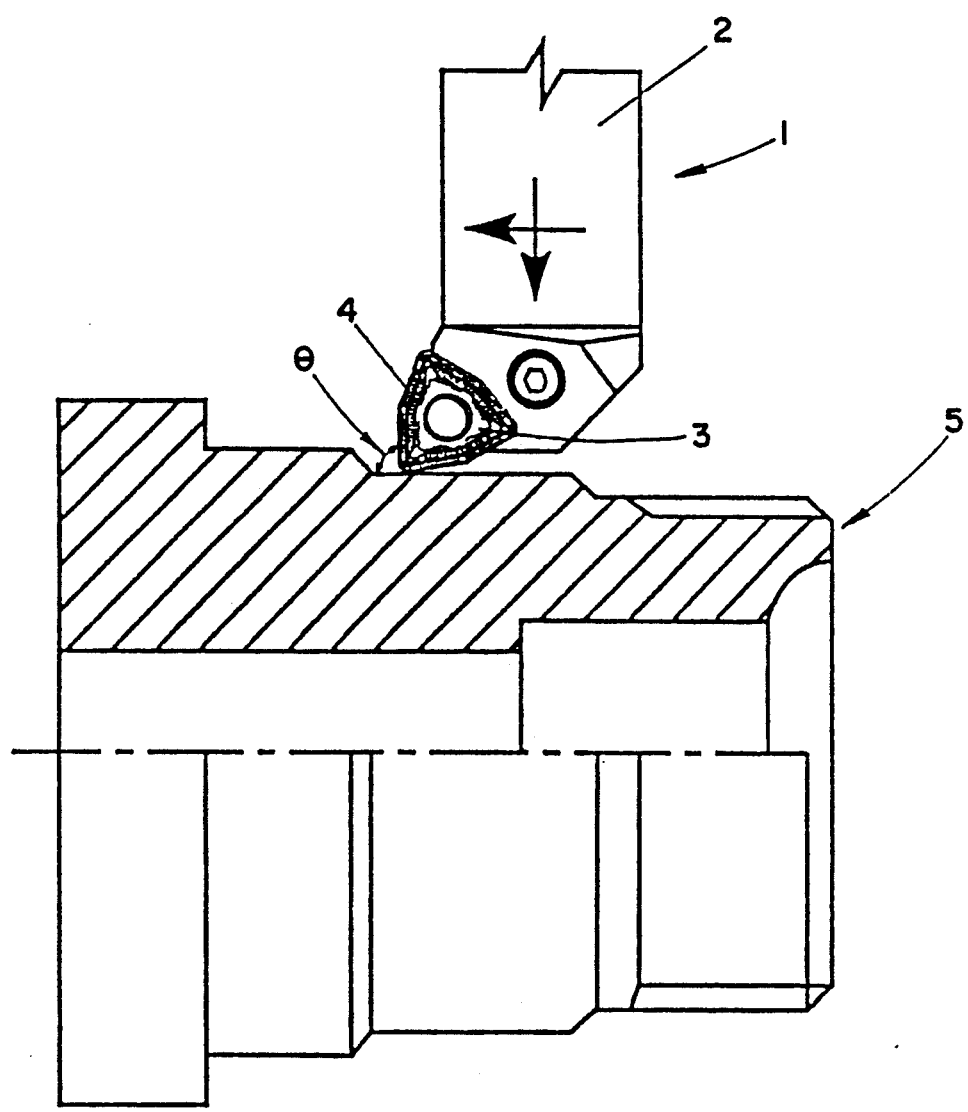
FIG. 1 shows a side view of a metal cutting tool in accordance with the invention, in association with a workpiece.
Figure 3:
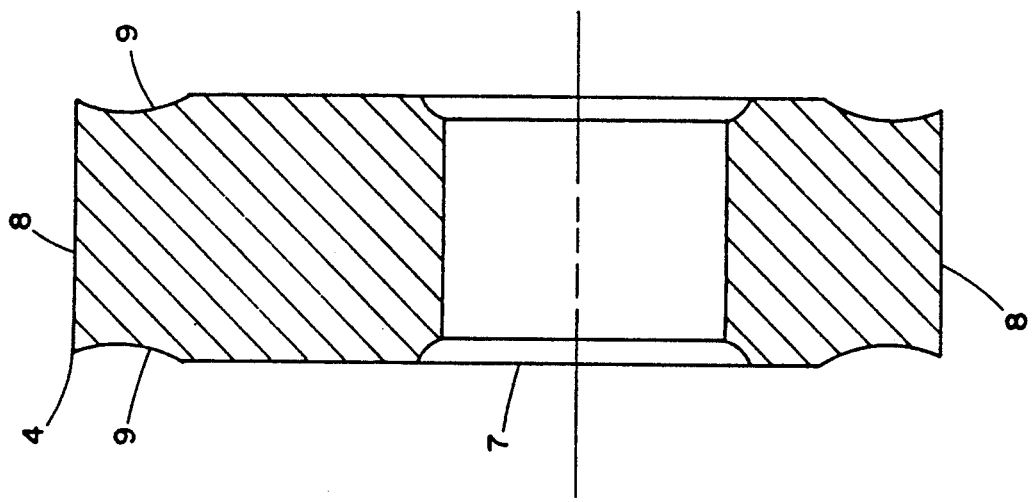
FIG. 3 is a cross-sectional view of the insert shown in FIG. 2, taken along the line III—III.
Figure 2:
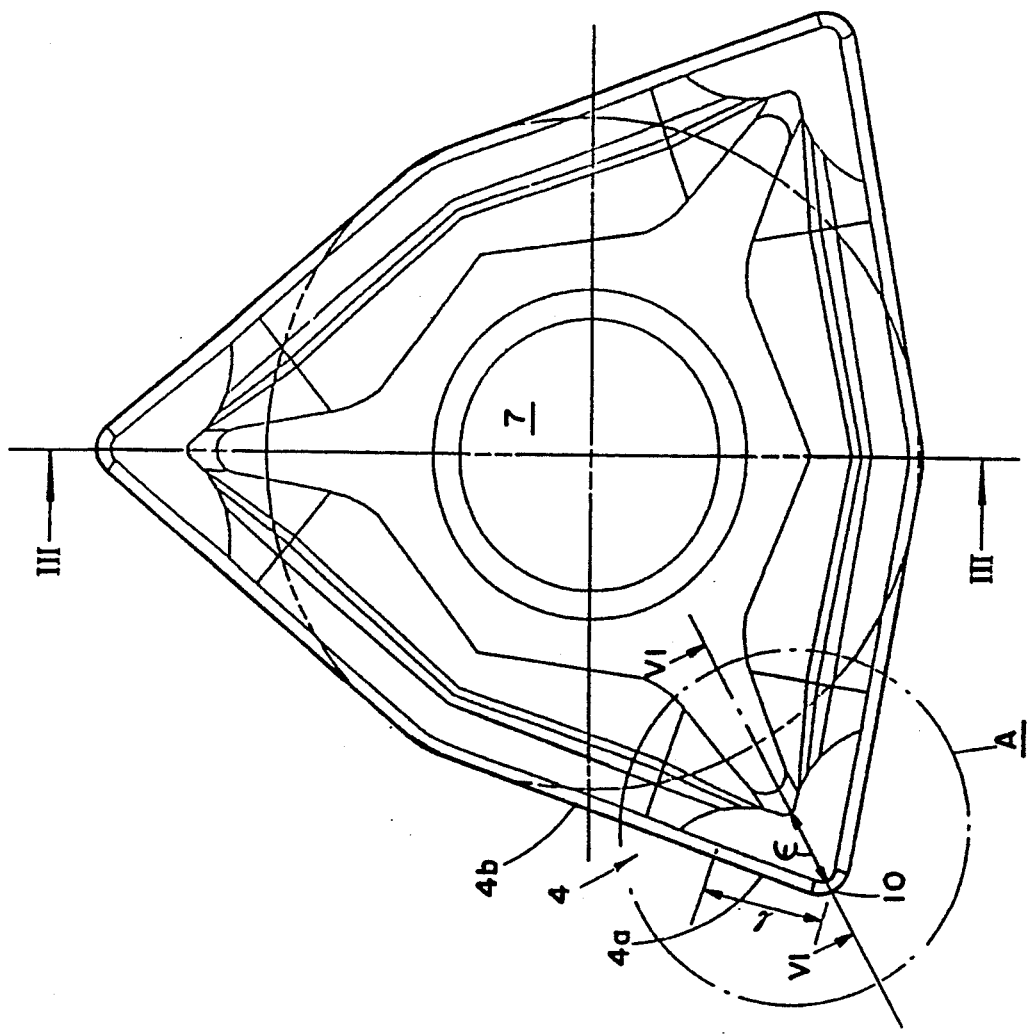
FIG. 2 is a plan view from above of a metal cutting insert in accordance with the invention, incorporated in the metal cutting tool shown in FIG. 1.
Figure 5:
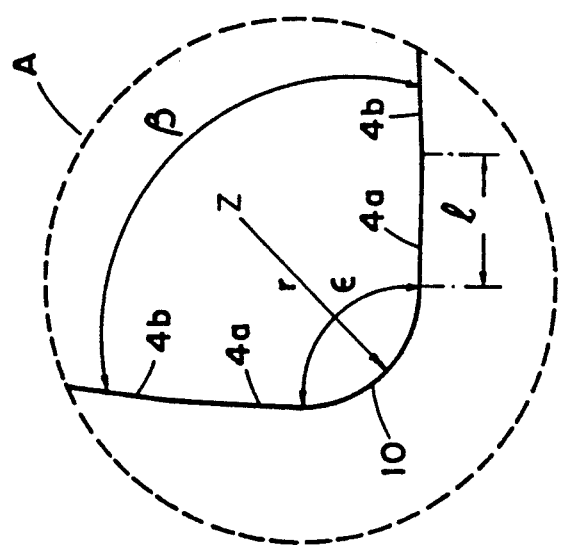
FIG. 5 is a view on an enlarged scale of a detail A of the insert shown in FIG. 2.

As seen in FIG. 1, a cutting tool 1 used for turning operations comprises a holder 2 in which is replaceably fitted an exchangeable cutting insert 3 which, in this embodiment, is of trigon shape. The insert 3 is provided with two cutting edges 4 on each side (i.e. six cutting edges in all) and, as seen in the drawings, is used to turn a workpiece 5. The insert 3 is located in the cutting tool 2 and so disposed with respect to the workpiece 5 that the cutting edge 4 thereof presents an angle of inclination $\theta$ with respect to the workpiece surface.

As seen in FIGS. 2 through 5 of the drawings, the insert is formed with a rake surface 7 and relief flanks 8, the cutting edges 4 being defined between the rake surface 7 and the relief flanks 8. A continuous chip former groove 9 extends around the insert adjacent the cutting edges 4. Adjacent relief flanks 8 merge at a curved insert nose 10 having a radius r.

As seen in FIGS. 2, 5, 7 and 8 of the drawings, each cutting edge 4 is formed of a first cutting edge portion 4a and a successive cutting edge portion 4b. The portions 4a define with each other an angle $\epsilon$ while the portions 4b define with each other an angle $\beta$ where $\beta$ is slightly less than $\epsilon$.

The first portions 4a of the cutting edges 4 are of length 1 which, as can be seen, is less than the length of the subsequent portions 4b.

Figure 4:
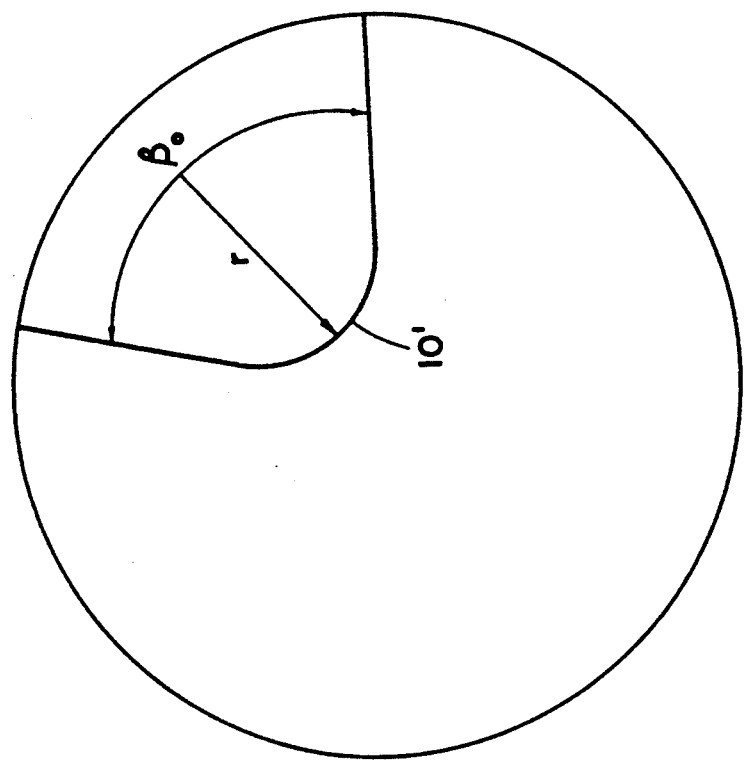
FIG. 4 is a view on an enlarged scale of a detail of a conventional insert of the same type as the insert shown in FIG. 1.

FIG. 4 shows, for the sake of comparison, the corner portion of a standard insert of the same trigon shape, where the nose portion 10' has a radius r but where the entire adjacent cutting edges define an angle $\beta$.

Figure 6:
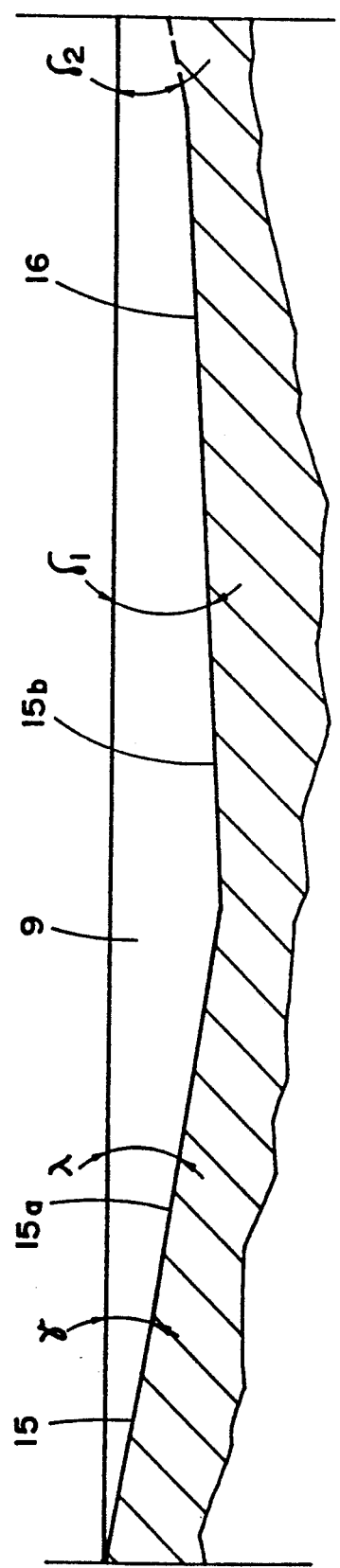
FIG. 6 is a cross-sectional view taken along the line VI—VI of a portion of the insert shown in FIG. 2.

Referring now to FIG. 6 of the drawings, it will be seen that the chip former groove 9 in the region of the nose 10 and the first cutting edge portions 4a comprises an initial land surface 15 which is positively disposed with respect to a base of the insert (not shown) at an angle $\gamma$ followed by a first portion of the chip former groove which slopes towards the base at an angle $\lambda$ and, at a relatively substantial distance from the nose, a deflector surface 16 of which a first portion of which defines an angle $\delta'$, with respect to the base and a second portion of which defines an angle $\delta_2$. Representative ranges of the angles $\gamma$, $\lambda$, $\delta'$ and $\delta_2$ are 0°–10°, 3°–15°, 0°–5° and 0°–45°.

The chip former construction in the region of the nose and the first cutting edge portions 4a are chosen so that chips formed in this region reach a desired minimal length prior to their breakage. In other words, the chips that become broken are relatively long chips and the frequency of breaking is therefore substantially reduced. In this way, it is ensured that vibrations induced in the cutting tool as a result of the chip breaking are of a relatively low frequency. At the same time, and in view of the fact that chips flow with minimal resistance over this chip forming region, the cutting forces exerted on the tool are significantly reduced and, in consequence, the amplitude of any vibrations which may be induced in the tool, is kept relatively low.

Thus, even with a relatively high feed it is possible to achieve a relatively high output and still have a very good quality of finish. Thus, e.g. with a feed rate as high as 0.8 mm/rotation a value for $R_t$ of 1 $\mu$m was obtained.

Figure 7:
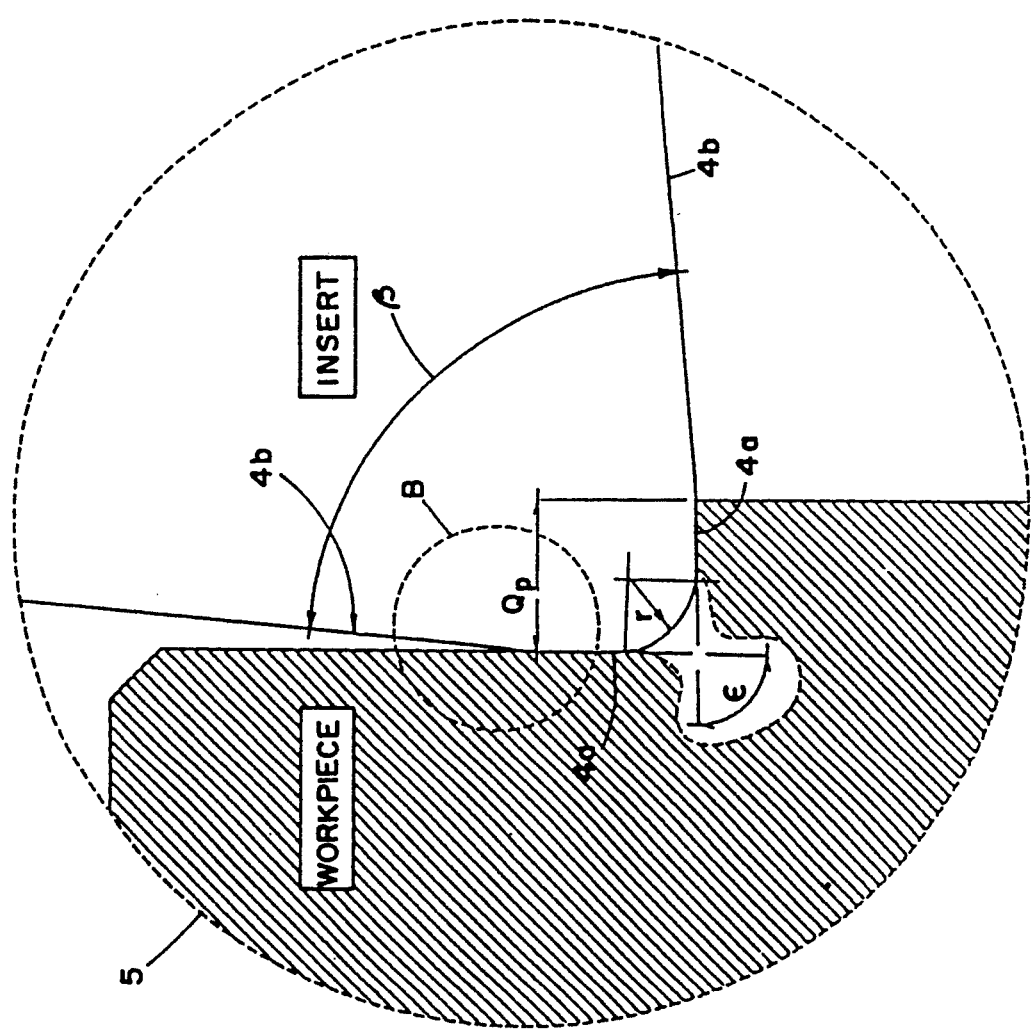
FIG. 7 is a schematic view of the cutting corner of an insert in accordance with the invention, positioned within a workpiece during a cutting operation.
Figure 8:
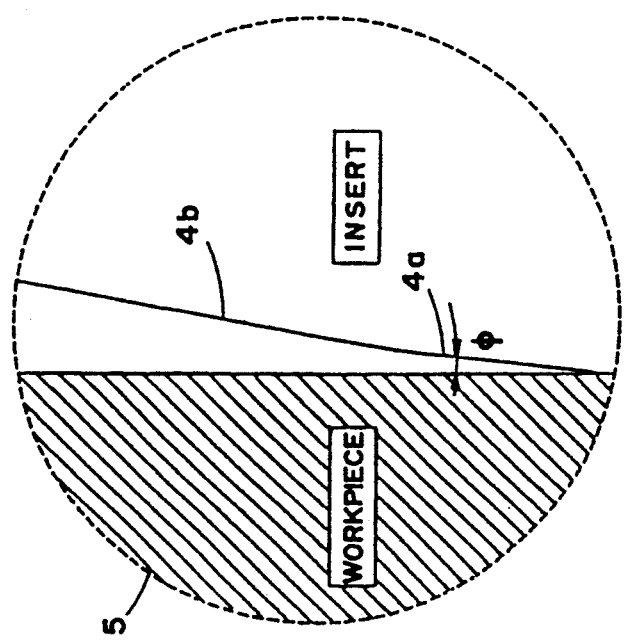
FIG. 8 is a view on an enlarged scale of a detail B seen in FIG. 7.

With a cutting insert as just described, and when incorporated in a cutting tool 1 for the turning of a work-piece 5, as seen in FIGS. 7 and 8 of the drawings whilst the first cutting edge portion 4a of one of the pair of cutting edges is used to effect turning of the workpiece, the other first cutting edge portion 4a or the other cutting edge of the pair is used to effect smoothing of the already turned surface. In order to ensure effective smoothing of this already turned surface, it is necessary to ensure that the first cutting edge portion 4a presents a relief angle $\phi$ with respect to the turned surface which lies substantially within the range of 0.3° to 2°.

In the embodiment just described, the cutting insert presents an angle of inclination $\theta$ with respect to the surface to be turned, of about 90°–95°. Bearing in mind a relief angle $\phi$ of between 0.3° to 2°, it will be readily seen that the angle $\epsilon$ lies in the range 90°–83°.

On the other hand, the subsequent cutting edge portions 4b define an angle $\beta$ which is slightly less than the angle $\epsilon$ and, in the example just described, the angle $\beta$ is equal to 80°.

Figure 9:
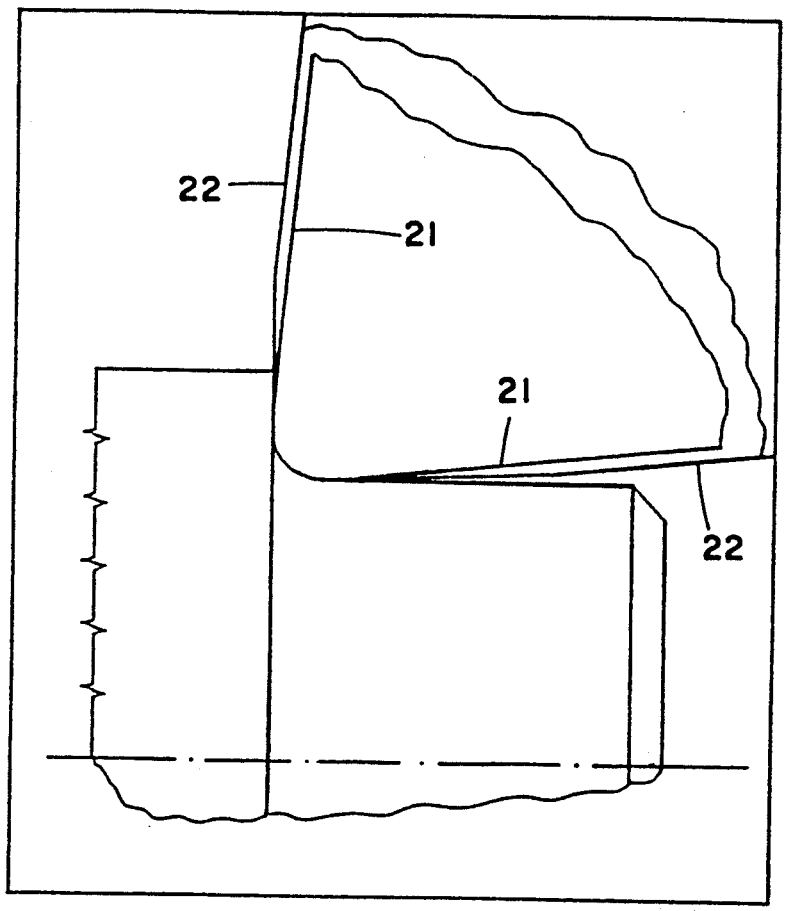
FIG. 9 is a schematic view of a conventional insert and an insert in accordance with the invention superimposed on each other and located in position in a workpiece during a cutting operation.

FIG. 9 shows clearly the differences between a conventional insert 21 shown in position on a workpiece to be turned and an insert in accordance with the invention 22 shown in the same position.

With an insert and cutting tool in accordance with the present invention, the provision of the first cutting edge portions which define angles slightly greater than the angle of the subsequent cutting edge portions ensures an effective smoothing of the turned surface. On the other hand, the association of the insert with a chip former groove which allows for the relatively thin chips formed in a finishing operation to flow with minimal resistance and to be broken at a lower frequency rate, ensures that the vibrations induced in the tool are kept relatively low, as is the amplitude of these vibrations. In this way, the insert and the tool associated therewith are particularly effective in achieving a high degree of smoothness of a turned surface, especially during finishing operations.

Whilst in the embodiment specifically described above both of the cutting edges of the pair enclosing the nose are formed with tangentially directed first cutting edge portions of length 1, the invention is equally applicable where only one of the cutting edges of the pair is so formed.

Furthermore the invention is equally applicable to insert shapes other than trigon such as for example rhombic, triangular etc.

We claim:

1. A metal cutting insert for use in turning or drilling operations and having a rake surface and a pair of relief flanks merging in a nose of radius r and defining with said rake surface a pair of cutting edges; at least one of said cutting edges having a first rectilinear portion of length l tangential with said nose and a subsequent second rectilinear portion; the first portion of one cutting edge enclosing an angle $\epsilon$ with a first corresponding portion of the other cutting edge, the second portion of said one cutting edge enclosing an angle $\beta$ with a second corresponding portion of the other cutting edge; a chip former groove being formed in said rake surface adjacent said cutting edges and said nose; a rake angle of said one cutting edge being substantially positive in the region of said nose and said first portion and the chip former groove adjacent thereto having a first portion which slopes towards a base of said insert, a subsequent chip deflecting portion so spaced from the cutting edge to allow for chips to have reached a predetermined minimal length prior to their deflection and wherein $l \geq$ maximum feed $f_{max}$, (nominal value) and $\epsilon$ is greater than $\beta$.

2. A metal cutting insert according to claim 1, wherein l is substantially equal to $f_{max}$, (nominal value).

3. A metal cutting insert according to claim 1, wherein said cutting edge first portion and said nose are associated with a land surface which slopes towards said insert base at an angle $\gamma$ and wherein said chip former groove first portion slopes towards said base at an angle $\lambda$, wherein $\gamma$ lies substantially in the range 0° to 10° and $\lambda$ lies substantially in the range 3° to 15°.

4. A metal cutting insert according to claim 1, wherein one said first cutting edge portions is designed to present an angle of cutting inclination $\theta$ and the other of said first cutting edge portions is designed to present a relief angle $\phi$ wherein $\phi$ lies substantially within the range 0.3° to 2°, so that $\epsilon$ substantially equals $180° - (\theta + \phi)$.

* * * * *